UNITED STATES PATENT OFFICE.

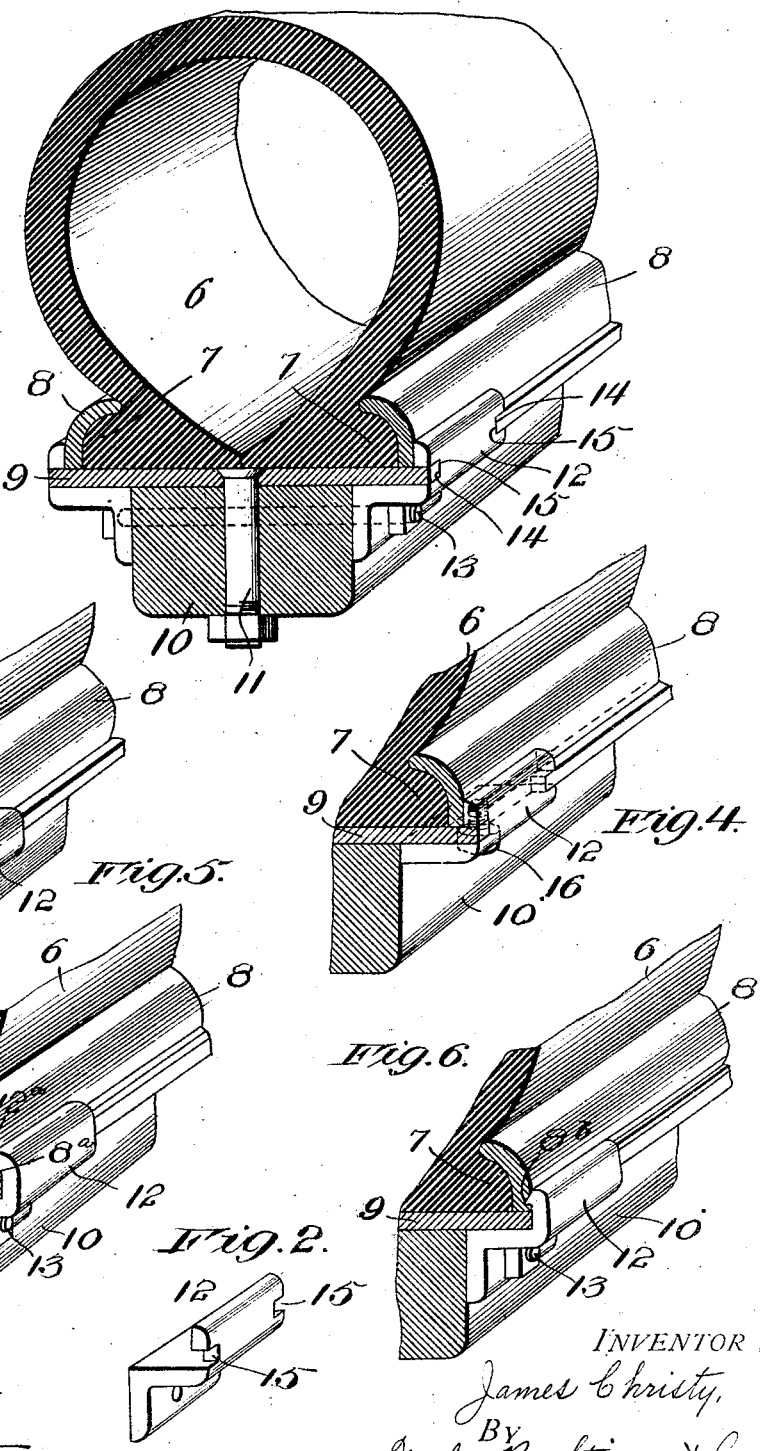

JAMES CHRISTY, OF AKRON, OHIO.

VEHICLE-TIRE.

No. 822,583.      Specification of Letters Patent.      Patented June 5, 1906.

Application filed August 11, 1905. Serial No. 273,788.

*To all whom it may concern:*

Be it known that I, JAMES CHRISTY, a citizen of the United States, residing at Akron, in the county of Summit and State of Ohio, have invented new and useful Improvements in Vehicle-Tires, of which the following is a specification.

This invention relates particularly to means for attaching and holding a tire to the wheel-rim and is particularly applicable to pneumatic tires.

It embodies detachable metal rings which engage over flanges at the base of the tire to hold the same to the rim, and these rings are held in place by clips which are fastened in one way or another to the rim or the felly.

The object of the invention is to form an improved device of the kind characterized particularly by simplicity and by secure means for holding the tire in place, the parts being so constructed that the tire may be readily detached or attached.

In the accompanying drawings, Figure 1 is a perspective view of a section of the wheel-rim and tire. Fig. 2 is a perspective view of one of the clips used to hold the rings in place. Fig. 3 is a perspective view showing a modified form of clip. Fig. 4 is a perspective view of another modification. Figs. 5 and 6 are perspective views of modifications.

Referring specifically to the drawings, 6 indicates a pneumatic tire of any desired style or construction, having at its base flanges 7 on each side.

8 indicates rings which are shaped to lie or fit over the flanges in order to hold the tire in place. These rings fit snugly over or around the rim 9 of the wheel, which rim is secured to the felly 10 by bolts 11. The rim is of greater width than the felly, so that it extends beyond the same on each side thereof.

To hold the rings 8 in place on the rim and against the flanges of the tire, clips 12 are employed. Several forms of these clips are shown. In Figs. 1 and 2 the clips are bolted at one end to the felly by cross-bolts 13 extending therethrough. With this form the edges of the rim 9 are notched, as at 14, and the clips are notched, as at 15, to form a neck which fits in the notch 14 and assists in holding the clips in place. The bodies of the clips are bent to fit against the side of the felly and against the under or inner side of the projecting portion of the rim, with the head of the clip bearing against the side of the ring 8.

In the form shown in Fig. 3 the rim is not notched; but the clip is bent to extend around the edge of the rim, with its outer end bearing against the ring 8.

In Fig. 4 instead of bolting the clips to the felly, as above described, they are secured to the under side of the projecting parts of the rim by means of cap-screws 16, tapped through the clips and into the rim.

The forms shown in Figs. 5 and 6 are designed especially to avoid the possibility of the rings jumping or springing out of the clips. To this end, as shown in Fig. 5, the ring 8 is provided with a rib or bead $8^a$ at its lower edge, and the clip 12 is shaped at the head to engage over this rib, as seen at $12^a$, thereby holding the ring against the rim and also holding the ring against the base of the tire. In Fig. 6 instead of the rib $8^a$ on the ring a notch $8^b$ is cut therein, and the lip of the clip fits in the notch and holds the ring in place.

In placing the tire it is put on the rim and the rings are then slipped on. The clips are then put in place and the parts bolted together. To detach the tire, it is simply necessary to loosen the clips and slip off one ring.

Having thus described my invention, what is claimed as new, and desired to be secured by Letters Patent, is—

1. A wheel having a felly, rim, and a yielding tire which rests on the rim, the base of the tire being narrower than the rim, in combination with rings which fit over and rest upon the rim and overhang the base of the tire at each side thereof, and clips which are secured to the felly and extend out beside and beyond the edge of the rim and engage the rings thereon.

2. The combination with a wheel-felly having an extended rim thereon, and a yielding tire resting on the rim having side flanges at its base, the rim being wider than the felly and tire-base, of rings which fit upon the rim and overhang the flanges of the tire, and clips which are secured to the felly and extend out beyond the edges of the rim and against the outer sides of the rings, to hold the latter in place.

3. The combination with a wheel-felly having an extended rim thereon notched at the edges, and a yielding tire on the rim having side flanges at the base, the rim being wider than the tire-base, of rings which fit upon the rim and overhang the flanges of the tire, and clips secured to the felly and having necks which fit in said notches and heads which bear against the outer sides of the rings and confine the same on the rim.

In testimony whereof I have signed my name to this specification in the presence of two subscribing witnesses.

JAMES CHRISTY.

Witnesses:
FRED N. SHAFFER,
J. H. CONNER.